US008016569B2

(12) United States Patent
Stam et al.

(10) Patent No.: US 8,016,569 B2
(45) Date of Patent: Sep. 13, 2011

(54) CONFIGURATION OF A WIND TURBINE NACELLE FOR TRANSPORTATION

(75) Inventors: Ronald Eduard Stam, Borne (NL); Kenneth Bradley Leland, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/797,159

(22) Filed: Jun. 9, 2010

(65) Prior Publication Data

US 2011/0142613 A1    Jun. 16, 2011

(51) Int. Cl.
F03D 11/00 (2006.01)
F03D 11/04 (2006.01)
F03D 9/00 (2006.01)

(52) U.S. Cl. ............ 416/245 R; 416/244 R; 416/244 A; 416/DIG. 6; 416/61; 416/146 R; 416/248; 415/118; 290/44; 290/55

(58) Field of Classification Search ............. 416/244 R, 416/244 A, DIG. 6, 61, 146 R, 248; 415/118; 290/44, 55

See application file for complete search history.

(56) References Cited

U.S. PATENT DOCUMENTS

| 2008/0014088 | A1* | 1/2008 | Rogall ........................... 416/174 |
| 2008/0247875 | A1* | 10/2008 | Yoshida ........................... 416/95 |
| 2010/0239416 | A1* | 9/2010 | Mogensen et al. .......... 415/182.1 |

FOREIGN PATENT DOCUMENTS

| WO | WO2007132408 | * 11/2007 |
| WO | WO2009150162 | * 12/2009 |

OTHER PUBLICATIONS

WO2009150162 machine translation from espacenet.*
Alstom ECO 100 & ECO 110 Brochure, pp. 1-8, 2009.

* cited by examiner

*Primary Examiner* — Ninh H Nguyen
*Assistant Examiner* — Liam McDowell
(74) *Attorney, Agent, or Firm* — Dority & Manning, P.A.

(57) ABSTRACT

A nacelle for a wind turbine includes a cover defining an internal volume. The cover has longitudinal sides and opposite end walls. A bedplate is within the cover with the power generation and wind turbine control components mounted on the bedplate. The cover has a widest width dimension along the longitudinal sides intermediate of the end walls that exceeds a pre-defined maximum width for rail transport of the nacelle. Removable caps are configured on the longitudinal sides of the cover at the widest dimension, with the caps having a configuration such that upon removal of the caps, the widest width dimension is less than the predefined maximum width for rail transport.

12 Claims, 3 Drawing Sheets

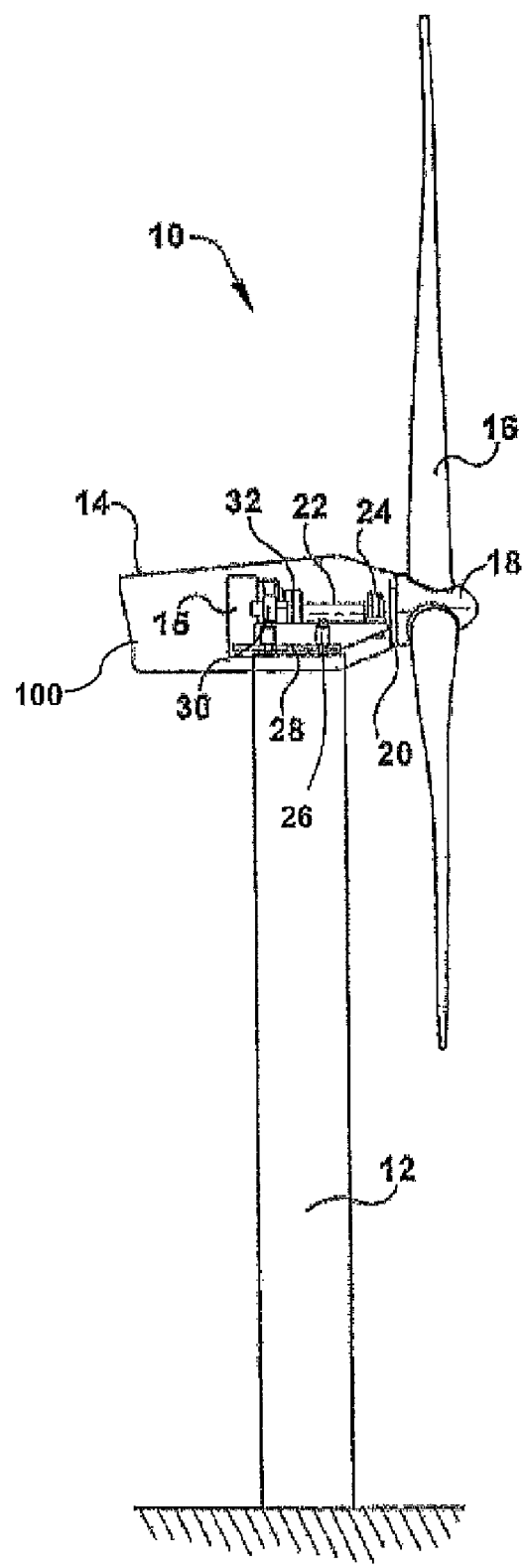
FIG. -1-
PRIOR ART

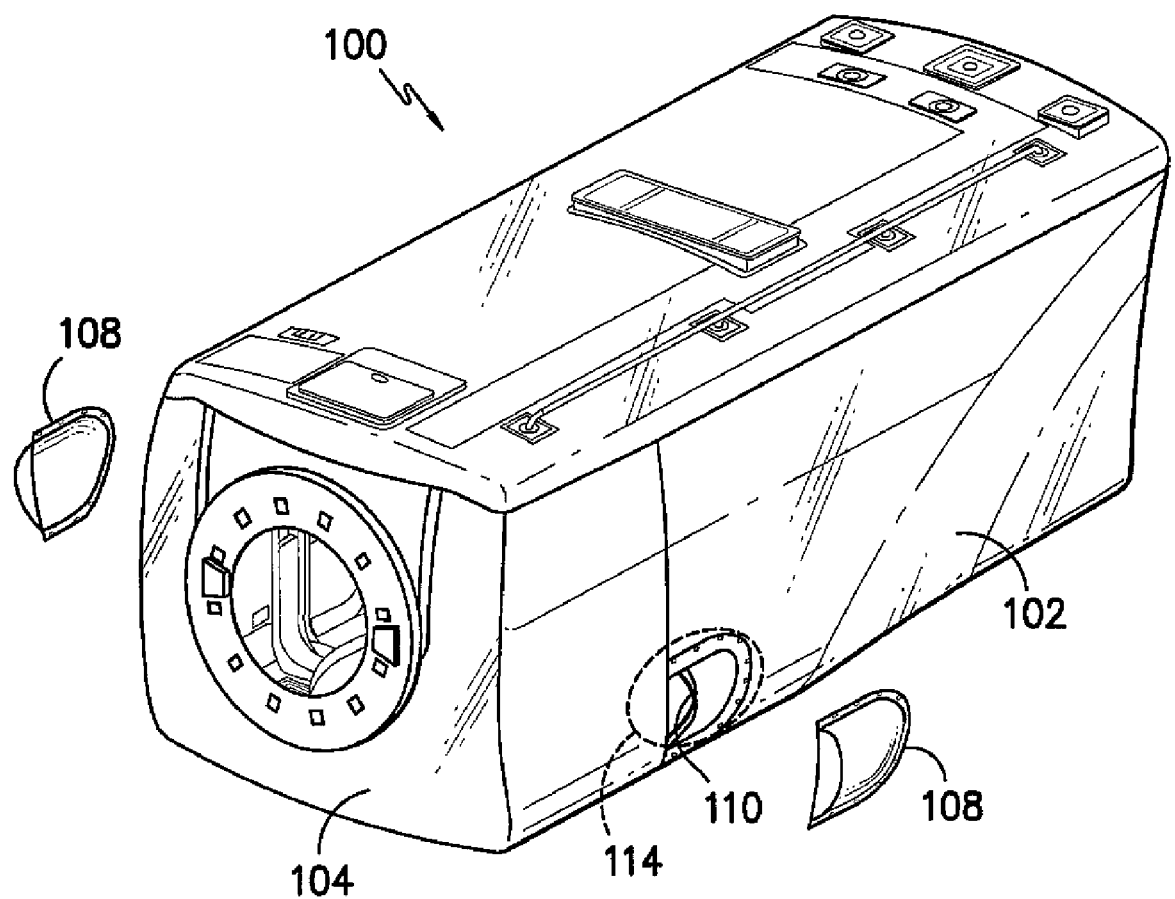
FIG. -2-

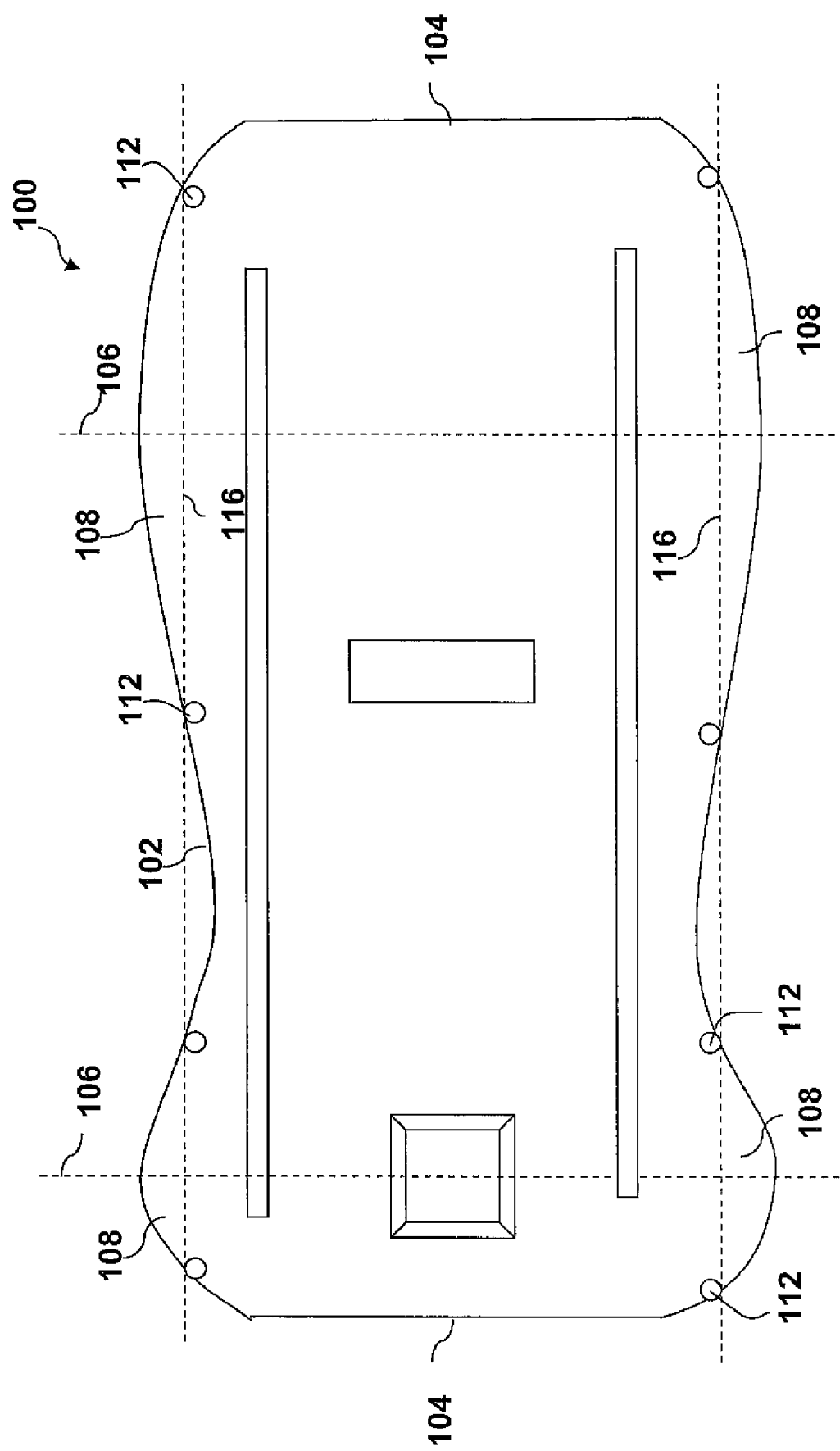
FIG. -3-

CONFIGURATION OF A WIND TURBINE NACELLE FOR TRANSPORTATION

FIELD OF THE INVENTION

The present invention relates generally to the field of wind turbines, and more particularly to a configuration of wind turbine nacelle for transportation.

BACKGROUND OF THE INVENTION

Wind power is considered one of the cleanest and most environmentally friendly energy sources presently available, and wind turbines have gained increased attention in this regard. A modern wind turbine typically includes a tower, generator, gearbox, nacelle, and one more rotor blades. The rotor blades capture kinetic energy from wind using known foil principles, and transmit the kinetic energy through rotational energy to turn a shaft that is coupled to the gearbox, or if a gearbox is not used, directly to the generator. The generator then converts the mechanical energy to electrical energy that may be supplied to a utility grid.

Modern wind turbines can be quite large, with many designs having a rotor hub height exceeding 100 meters. In this regard, the logistical costs associated with transporting the wind turbine components to the erection site can be quite substantial and must be factored into the overall cost efficiency of wind energy. In this regard, it has been estimated that rail transportation of wind turbine components can provide approximately a fifty percent savings as compared to other means. However, there are size restrictions on the components that can be transported by rail. For example, generally a width restriction of 4 meters is imposed on components transported by rail and, in this regard, the width of the nacelle is becoming a limiting factor for rail transport of the component, particularly as wind turbine designs grow increasingly larger.

Alstom Wind of Barcelona, Spain, offers a 3.0 MW wind turbine (the ECO 100 and ECO 110 models) with a modular hub and nacelle construction. The nacelle module is made up of three housing units: a central housing and two lateral housings that attach to the longitudinal sides of the central housing and provide extra space for installation of the power transformer, inverter, and control cabinets. In an assembled state the nacelle has stated dimensions of 4.5×4.3×9.7 meters (W×H×D). This modular construction is alleged to provide greater ease of transport. However, due to the extreme length of the lateral housing units, the nacelle components are not capable of being transported by a single rail car even with the lateral housings removed. The lateral housings may require an additional rail car or other transport means, which adds substantially to the overall expense of transporting the wind turbine.

Accordingly, the industry would benefit from an advance in nacelle construction that would allow for efficient and cost effective rail transport of nacelles that exceed a maximum width restriction placed on rail transport.

BRIEF DESCRIPTION OF THE INVENTION

Aspects and advantages of the invention will be set forth in part in the following description, or may be obvious from the description, or may be learned through practice of the invention.

In accordance with aspects of the invention, a nacelle for a wind turbine includes a cover defining an internal volume. The cover has longitudinal sides and opposite end walls. A plurality of power generation and wind turbine control components are mounted within the internal volume of the cover, for example on a bed plate. The cover has a widest width dimension along the longitudinal sides intermediate of the end walls that exceeds a pre-defined maximum width for rail transport of the nacelle. This maximum width may be, for example, 4 meters. At least one removable cap is configured on a longitudinal side of the cover at the widest dimension. The cap or caps have a configuration such that upon removal of the cap, the widest width dimension of the nacelle cover is less than the predefined maximum width for rail transport.

In a particular embodiment, at least one of the removable caps is configured on each of the longitudinal sides. For example, the caps may be disposed along the longitudinal sides at a location that accommodates yaw drives mounted within the nacelle cover.

The caps may have a longitudinal length that corresponds essentially to only the portion of the cover side that extends beyond the maximum width dimension, and may be less than about 50% or less than about 25% of the overall length of the longitudinal sides of the cover. In this manner, the caps may have a size and configuration so as to be stored within the cover during transport of the nacelle.

In a unique embodiment, the nacelle is assembled such that the caps only cover components attached to a bedplate within the cover. Attachment or removal of the caps requires no additional assembly or disassembly of any of the power generation and wind turbine control components within the caps prior to or after attachment or removal of the caps.

The present invention also encompasses a unique method for reducing the width of a wind turbine nacelle to less than a predefined maximum width for rail transport, the nacelle having a cover defining an internal volume defined by longitudinal sides and opposite end walls with a plurality of power generation and wind turbine control components mounted within the internal volume of the cover. the method includes providing at least one removable cap at a location along a portion of the longitudinal sides walls of the cover at a widest width dimension of the cover that exceeds the pre-defined maximum width for rail transport such that upon removal of the cap, the widest width dimension is less than the predefined maximum width for rail transport. A temporary covering is placed over an opening created in the nacelle cover by removal of the cap.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWING

A full and enabling disclosure of the present invention, including the best mode thereof, directed to one of ordinary skill in the art is set forth in the specification, which makes reference to the appended figures, in which:

FIG. 1 is a perspective view of a conventional wind turbine, and particularly illustrates a nacelle mounted atop of a tower;

FIG. 2 is a perspective view of an embodiment of a nacelle in accordance with aspects of the invention; and FIG. 3 is a top diagrammatic view of an embodiment of a nacelle cover illustrating features of the invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of turbine blades 16 are mounted to a rotor hub 18, which is in turn connected to a main flange 20 that turns a main rotor shaft 22. The nacelle 14 includes a cover ("skin") 100 and the power generation and control components are supported within the cover 100, for example on a bedplate 28 housed within the internal volume of the cover 100. Briefly, the main rotor shaft 22 is supported by a bearing 24 relative to the bedplate 28. A main flange 20 is attached to the shaft 22 at the forward end thereof and connects with the rotor hub 18. The opposite end of the main rotor shaft 22 is coupled to the gearbox 30 via a shrink coupling 32. The gearbox 30 is connected to a generator 15 via a high speed shaft (not shown). The blades 16 convert motive force of wind into rotational mechanical energy via the shaft 22 and gearbox 30 to generate electricity with the generator 15.

Any number of other components related to the turbine generator drive train or operation of the wind turbine may be configured on the bedplate 28, for example yaw drives 26, control equipment, coolers, and the like. The view of FIG. 1 is provided for illustrative purposes only, and the invention is not limited to any particular type of drive train or other equipment configuration within nacelle 14 or other structure.

Referring to FIGS. 2 and 3, the nacelle cover 100 is illustrated. The cover 100 includes longitudinal sides 102 and end walls 104. The nacelle cover 100 is illustrated in the figures as a generally rectangular or box-shaped structure. It should be appreciated that the overall configuration and shape of the nacelle cover 100 is not a limiting factor of the invention. As discussed above with respect to FIG. 1, the nacelle cover 100 defines an internal volume in which the bedplate 28 is housed. The power generation and control components discussed above with respect to FIG. 1 are mounted on the bedplate 28 and are thus contained within the internal volume of the nacelle cover 100.

The nacelle cover 100 has an external shape so as to accommodate the components within the interior volume thereof. This configuration may, however, result in portions or sections of the longitudinal sides 102 exceeding a pre-defined maximum width for transport of the nacelle via rail. In many jurisdictions, this width may be, for example, 4 meters. If any portion of the nacelle 14 exceeds the 4 meter width, then the nacelle 14 cannot be transported by rail, which adds significant expense to the overall construction and logistical considerations for erecting the wind turbine.

Referring to FIGS. 2 and 3, at least one removable cap 108 may be configured on one or both of the longitudinal sides 102 of the cover 100 at the widest dimension 106 of the nacelle. These caps 108 are essentially a portion of the covering material of the nacelle cover 100 that, upon removal thereof, define an opening 110 into the interior volume of the nacelle cover 100. The caps 108 have a shape and configuration such that upon removal thereof, the widest width dimension 106 of the nacelle cover 100 is less than the predefined maximum width for rail transport.

Referring to FIG. 2, the removable caps 108 are at a location to accommodate for the forward yaw drives 26 (FIG. 1). These yaw drives 26 define a widest dimension of the components on the bed plate 28 and, in order to accommodate the yaw drives 26 within the interior volume of the nacelle cover 100, the cover "protrudes" in the area of the yaw drives 26. The caps 108 are removable at this location and, upon removal of the caps 108, the widest width dimension 106 of the nacelle 14 is less than the pre-defined maximum width discussed above.

Referring to FIG. 3, a second removable cap 108 is illustrated for each of the longitudinal sides 102. It should be appreciated that any number and location of the caps 108 along the longitudinal sides 102 is within the scope and spirit of the invention. FIG. 3 depicts that, upon removal of both of the caps 108, the nacelle cover 100 has a longitudinal width measured between the axes 116 that is less than the predefined maximum width. It should thus be appreciated that the present invention encompasses any configuration of caps 108 that, upon removal, result in a nacelle cover 100 having desired dimensions for transport.

The caps 108 may be affixed to the longitudinal sides 102 by any suitable attaching mechanism 112. For example, the caps 108 may be bolted to the longitudinal sides 102, attached via an adhesive, latch, hook and loop material, or any other suitable mechanism.

Referring to FIG. 2, upon removal of the caps 108, an opening 110 is defined in the longitudinal side 102. It may be desired to place a temporary covering 114 over the opening during transport. This covering 114 may be, for example, simply a temporary weatherproof material that is temporarily adhered or otherwise attached to the sides of the cover 100 over the openings 110.

It should be appreciated from FIGS. 1 and 2 that the caps 108 do not constitute modular components that define the completed enclosed nacelle 14. In other words, as particularly seen in FIG. 2, the nacelle cover 100 defines an enclosed interior volume in which the bedplate 28 (and components mounted thereon) is housed. The removable caps 108 are simply portions or sections of the longitudinal walls 102 that are removable so as to reduce the width dimension of the nacelle cover 100 at that particular location. The caps 108 do not define an interior volume in which power generation or control components are subsequently mounted. In other words, there are no components that are completely contained within the interior volume of the caps 108. The caps 108 merely accommodate the outer transverse dimensions of components mounted on the bedplate 28 within the nacelle 14. Although not desired, removal of the caps 108 will not affect operability of the power generation and control components within the nacelle 14. Likewise, there is no additional assembly or disassembly of any other power generation and wind turbine control components required for removal or attachment of the caps 108.

It should also be readily appreciated from FIGS. 2 and 3, that the caps 108 have a longitudinal length that is significantly less than the overall length of the longitudinal sides 102 of the covering 100. The caps 108 may have a length that is less than about 50 percent of the length of the sides 102, or less than about 25 percent of the length of the sides 102. Also, the caps do not extend completely between the top and bottom sides of the nacelle cover 100, as particularly illustrated in FIG. 2.

The construction of nacelle cover 100 described herein allows for a cover that, when completely assembled, may exceed the predefined maximum width of a component for rail transport. The cover 100, however, is readily modified to come within the predefined maximum width by removal of well-defined sections of the cover at the widest width thereof that cause the cover to exceed the predefined maximum width. These removable caps or portions 108 are relatively small as compared to the overall dimensions of the assembled nacelle cover 100 and are readily housed within the internal volume of the nacelle cover 100 during transport. It is not necessary that another rail car or other dedicated transport means be utilized for independent transport of the caps 108.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A nacelle for a wind turbine, comprising:
   a cover defining an internal volume, said cover having longitudinal sides and opposite end walls;
   a plurality of power generation and wind turbine control components mounted within said internal volume of said cover;
   said cover having a widest width dimension along a portion of said longitudinal sides intermediate of said end walls that exceeds a pre-defined maximum width for rail transport of said nacelle;
   at least one removable cap configured on said longitudinal sides of said cover at said widest dimension, said cap having a configuration such that upon removal of said cap, said widest width dimension is less than the pre-defined maximum width for rail transport; and
   said cap being a sub-component of said cover along said longitudinal side such that a perimeter of said cap is defined completely within said cover, wherein portions of said cover along said longitudinal side that do not extend beyond the predefined maximum width are not removable and remain intact on said nacelle.

2. The nacelle as in claim 1, further comprising at least one of said caps disposed along each said longitudinal side of said cover at a location that accommodates yaw drives within said cover.

3. The nacelle as in claim 1, wherein said widest width dimension of said cover with said cap removed is less than 4 meters.

4. The nacelle as in claim 1, further comprising a temporary covering attached over openings in said cover upon removal of said cap.

5. The nacelle as in claim 1, wherein said cap has a longitudinal length that is less than about 50% of the length of said longitudinal sides.

6. The nacelle as in claim 1, wherein said cap has a longitudinal length that is less than about 25% of the length of said longitudinal sides.

7. The nacelle as in claim 1, wherein said cap has a size and configuration so as to be stored within said cover during transport of said nacelle.

8. The nacelle as in claim 1, further comprising a bedplate within said cover, said power generation and wind turbine control components mounted on said bedplate, and wherein said nacelle is assembled such that said cap only covers components attached to said bedplate and attachment or removal of said cap requires no additional assembly or disassembly of any of said power generation and wind turbine control components subsequent to or after attachment of said cap.

9. A method for reducing the width of a wind turbine nacelle to less than a predefined maximum width for rail transport, the nacelle having a cover defining an internal volume defined by longitudinal sides and opposite end walls with a plurality of power generation and wind turbine control components mounted within the internal volume of the cover, the method comprising:
   providing at least one removable cap at a location along a portion of the longitudinal sides walls of the cover at a widest width dimension of the cover that exceeds the pre-defined maximum width for rail transport such that upon removal of the cap, the widest width dimension is less than the predefined maximum width for rail transport;
   the cap being a sub-component of the cover along the longitudinal side wall such that a perimeter of the cap is defined completely within the cover, wherein portions of the cover along the longitudinal side wall that do not extend beyond the predefined maximum width are not removable and remain intact on the nacelle; and
   placing a temporary covering over an opening created in the nacelle cover by removal of the cap.

10. The method as in claim 9, comprising locating at least one of the caps along each longitudinal side of the cover at a location that accommodates yaw drives within the cover.

11. The method as in claim 9, wherein the widest width dimension of the cover is less than 4 meters with the cap removed.

12. The method as in claim 9, further comprising storing the removed cap within the cover during transport of the nacelle.

* * * * *